United States Patent
Drerup et al.

(10) Patent No.: US 12,487,857 B1
(45) Date of Patent: Dec. 2, 2025

(54) AI AGENT-DRIVEN INTERACTION MODEL FOR APPLICATIONS

(71) Applicant: Maplebear Inc., San Francisco, CA (US)

(72) Inventors: Tilman Drerup, Berkeley, CA (US); Haixun Wang, Bellevue, WA (US); Sharath Rao Karikurve, Berkeley, CA (US)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 19/219,859

(22) Filed: May 27, 2025

Related U.S. Application Data

(60) Provisional application No. 63/652,553, filed on May 28, 2024.

(51) Int. Cl.
G06F 9/50 (2006.01)

(52) U.S. Cl.
CPC .................................. *G06F 9/5027* (2013.01)

(58) Field of Classification Search
None
See application file for complete search history.

(56) References Cited

U.S. PATENT DOCUMENTS

| | | | | |
|---|---|---|---|---|
| 11,632,341 B2 * | 4/2023 | Wang | ...................... | H04L 51/02 709/206 |
| 12,014,251 B2 * | 6/2024 | Yang | ...................... | G06N 5/022 |
| 12,380,340 B1 * | 8/2025 | Mamut | .................. | G06N 5/022 |
| 2015/0206224 A1 * | 7/2015 | Ouimet | ............. | G06Q 30/0251 705/26.7 |
| 2017/0372703 A1 | 12/2017 | Sung et al. | | |
| 2020/0335097 A1 * | 10/2020 | Seol | ....................... | G10L 15/197 |
| 2021/0288927 A1 * | 9/2021 | Wang | ................... | G06K 7/1417 |
| 2022/0172121 A1 * | 6/2022 | Yang | ....................... | G06N 5/022 |
| 2022/0383865 A1 | 12/2022 | McDermid et al. | | |
| 2023/0410801 A1 | 12/2023 | Mishra | | |
| 2024/0354641 A1 * | 10/2024 | Miller | ..................... | G06N 3/045 |
| 2025/0039110 A1 * | 1/2025 | Ferraris | ................. | H04L 51/046 |
| 2025/0045848 A1 * | 2/2025 | Focke | .................. | G06Q 10/103 |
| 2025/0086647 A1 * | 3/2025 | Gao | ....................... | G06Q 30/015 |
| 2025/0103910 A1 * | 3/2025 | Turley | .................... | G06N 20/00 |
| 2025/0117386 A1 * | 4/2025 | Agarwal | ........... | G06F 16/24542 |
| 2025/0165296 A1 * | 5/2025 | Hwang | ................... | G06F 40/30 |
| 2025/0225412 A1 * | 7/2025 | Coelho, Jr. | ............. | G06N 5/04 |
| 2025/0245030 A1 * | 7/2025 | Cyjon | ...................... | G06F 8/71 |
| 2025/0245124 A1 * | 7/2025 | Jones | ................... | G06N 3/0475 |

OTHER PUBLICATIONS

Li et al.; "TrainerAgent: Customizable and Efficient Model Training through LLM-Powered Multi-Agent System"; operaarXiv: 2311.06622v2 [cs.AI] Nov. 23, 2023; (Li_2023.pdf) (Year: 2023).*

(Continued)

*Primary Examiner* — Hiren P Patel
(74) *Attorney, Agent, or Firm* — Fenwick & West LLP

(57) ABSTRACT

An online system configures one or more system AI agent instances that interact with user AI agents and performs one or more tasks on behalf of the online system. Thus, responsive to detecting the presence of a user AI agent representing a particular user, the online system directs the session for the user to communicate and interact with a system AI agent.

18 Claims, 8 Drawing Sheets

(56) References Cited

OTHER PUBLICATIONS

Garcia-Serrano et al.; "Using AI techniques to support advanced interaction capabilities in a virtual assistant for e-commerce"; 2003 Published by Elsevier Ltd; doi: 10.1016/j.eswa.2003.09.012; (Serrano_2003.pdf) (Year: 2003).*
Patent Treaty Cooperation, International Search Report and Written Opinion, PCT International Patent Application No. PCT/US2025/031055, Jul. 21, 2025, 26 pages.

* cited by examiner

AI AGENT-DRIVEN INTERACTION MODEL FOR APPLICATIONS

CROSS-REFERENCE TO RELATED APPLICATIONS

This application claims the benefit of U.S. Provisional Patent Application No. 63/652,553, filed on May 28, 2024, which is incorporated by reference herein in its entirety.

BACKGROUND

An artificial intelligence (AI) agent is a decision-making computer system powered by one or more large-scale language models (LLM's) that aid in the decision making. An online system (e.g., e-commerce platform) is an online platform that connects users and retailers. A user can place an order for purchasing items, such as groceries, from participating retailers via the online system, with the shopping being done by a picker. The user or picker may have questions or need help while interacting with the online system and performing related tasks. A user of the online system may deploy an AI agent to represent the user to perform various tasks in conjunction with the online system. However, current online computing systems lack effective systems that engage with these agents and take advantage of their interactions and knowledge base.

SUMMARY

In accordance with one or more aspects of the disclosure, a system creates an instance of a system artificial intelligence (AI) agent for an online system, wherein the system AI agent is configured to access a machine-learning language model. The system creates an agent executor instance. In one or more embodiments, the agent executor instance is a compute process. The system detects an instance of a user AI agent representing a user of the online system. For one or more iterations, the system receives a message from the user AI agent. The system provides one or more prompts for input to the machine-learning language model to request actions to execute for a current iteration. The input may include the received message from the user AI agent. The system parses responses from the machine-learning language model to extract a set of selected actions and action inputs for the set of selected actions. The system triggers, via the agent executor instance, execution of a set of respective tools corresponding to the selected actions with the action inputs. The system generates a message for the user AI agent for the current iteration based at least on results of executing the set of respective tools. The system provides the generated message for the current iteration to the user AI agent. The system extracts, from an interaction of the messages between the system AI agent and the user AI agent, a proposed agreement between the user and the online system. The system performs one or more actions to execute the proposed agreement.

DETAILED DESCRIPTION

Figure 1A:
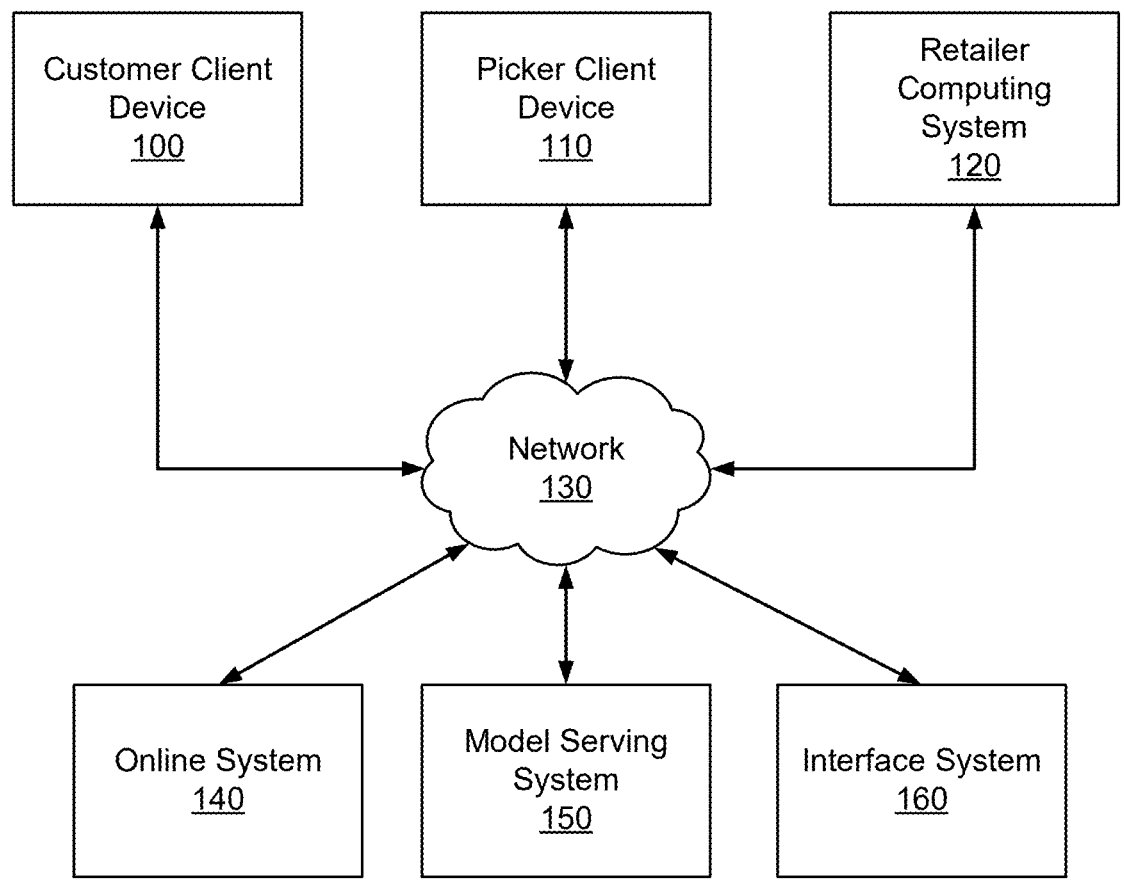
FIG. 1A illustrates an example system environment for an online system, in accordance with one or more embodiments.

FIG. 1A illustrates an example system environment for an online system 140, in accordance with one or more embodiments. The system environment illustrated in FIG. 1A includes a customer client device 100, a picker client device 110, a retailer computing system 120, a network 130, and an online system 140. Alternative embodiments may include more, fewer, or different components from those illustrated in FIG. 1A, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online system 140. Additionally, while one customer client device 100, picker client device 110, and retailer computing system 120 are illustrated in FIG. 1, any number of customers, pickers, and retailers may interact with the online system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In one or more embodiments, the customer client device 100 executes a client application that uses an application programming interface (API) to communicate with the online system 140.

A customer uses the customer client device 100 to place an order with the online system 140. An order specifies a set of items to be delivered to the customer. An "item", as used herein, means a good or product that can be provided to the customer through the online system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In one or more embodiments, the order also specifies one or more retailers from which the ordered items should be collected.

The customer client device 100 presents an ordering interface to the customer. The ordering interface is a user interface that the customer can use to place an order with the online system 140. The ordering interface may be part of a client application operating on the customer client device 100. The ordering interface allows the customer to search for items that are available through the online system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected. The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 may include a communication interface that allows the customer to communicate with a picker that is servicing the customer's order. This communication interface allows the user to input a text-based message to transmit to the picker client device 110 via network 130. The picker client device 110 receives the message from the customer client device 100 and presents the message to the picker. The picker client device 110 also includes a communication interface allowing the picker to communicate with the customer. The picker client device 110 transmits a message provided by the picker to the customer client device 100 via the network 130. In one or more embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, and/or the online concierge system 140. The picker client device 110 can be a personal or mobile computing device, such as a smartphone, a tablet, a laptop computer, or desktop computer. In one or more embodiments, the picker client device 110 executes a client application that uses an application programming interface (API) to communicate with the online system 140.

The picker client device 110 receives orders from the online system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In one or more embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In one or more embodiments, the picker client device 110 transmits to the online system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In one or more embodiments, rather than or in addition to using a barcode scanner, the picker client device 110 captures one or more images of the item and determines the item identifier for the item based on the images. The picker client device 110 may determine the item identifier directly or by transmitting the images to the online system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In one or more embodiments, the picker client device 110 tracks the location of the picker as the picker delivers orders to delivery locations. The picker client device 110 collects location data and transmits the location data to the online system 140. The online concierge system 140 may transmit the location data to the customer client device 100 for display to the customer such that the customer can keep track of when their order will be delivered. Additionally, the online system 140 may generate updated navigation instructions for the picker based on the picker's location. For example, if the picker takes a wrong turn while traveling to a delivery location, the online system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online system 140.

Additionally, while the description herein may primarily refer to pickers as humans, in one or more embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online system 140. As used herein, a "retailer" is an entity that operates a "retailer location," which is a store, warehouse, or other building from which a picker can collect items. The retailer computing system 120 stores and provides item data to the online system 140 and may regularly update the online concierge system 140 with updated item data. For example, the retailer computing system 120 provides item data indicating which items are available at a retailer location and the quantities of those items. In addition, the retailer computing system 120 may transmit updated item data to the online system 140 when an item is not available at the retailer location. Additionally, the retailer computing system 120 may provide the online system 140 with updated item prices, sales, or availabilities. In addition, the retailer computing system 120 may receive payment information from the online system 140 for orders serviced by the online system 140. Alternatively, the retailer computing system 120 provides payment to the online system 140 for some portion of the overall cost of a user's order (e.g., as a commission).

The customer client device 100, the picker client device 110, the retailer computing system 120, and/or the online system 140 can communicate with each other via the network 130. The network 130 is a collection of computing devices that communicate via wired or wireless connections. The network 130 may include one or more local area networks (LANs) or one or more wide area networks (WANs). The network 130, as referred herein, is an inclusive term that may refer to any or all of standard layers used to describe a physical or virtual network, such as the physical layer, the data link layer, the network layer, the transport layer, the session layer, the presentation layer, and/or the application layer. The network 130 may include physical media for communicating data from one computing device to another computing device, such as MPLS lines, fiber optic cables, cellular connections (e.g., 3G, 4G, 5G spectra), or satellites. The network 130 also may use networking protocols like TCP/IP, HTTP, SSH, SMS, or FTP, to transmit data between computing devices. In one or more embodiments, the network 130 may include Bluetooth or near-field communication (NFC) technologies or protocols for local communications between computing devices. The network 130 may transmit encrypted or unencrypted data.

The online system 140 is an online system by which customers can order items to be provided to them by a picker from a retailer. The online system 140 receives orders from a customer client device 100 through the network 130. The online system 140 selects a picker to service the customer's order and transmits the order to a picker client device 110 associated with the picker. The picker collects the ordered items from a retailer location and delivers the ordered items to the customer. The online system 140 may charge a customer for the order and provide portions of the payment from the customer to the picker and the retailer.

As an example, the online system 140 may allow a user to order groceries from a grocery store retailer. The user's order may specify which groceries they want delivered from the grocery store and the quantities of each of the groceries. The customer's client device 100 transmits the customer's order to the online system 140 and the online system 140 selects a picker to travel to the grocery store retailer location to collect the groceries ordered by the customer. Once the picker has collected the groceries ordered by the customer, the picker delivers the groceries to a location transmitted to the picker client device 110 by the online system 140. The online system 140 is described in further detail below with regards to FIG. 2.

The model serving system 150 receives requests from the online system 140 to perform tasks using machine-learned models. The tasks include, but are not limited to, natural language processing (NLP) tasks, audio processing tasks, image processing tasks, video processing tasks, and the like. In one or more embodiments, the machine-learned models deployed by the model serving system 150 are models configured to perform one or more NLP tasks. The NLP tasks include, but are not limited to, text generation, query processing, machine translation, chatbots, and the like. In one or more embodiments, the language model is configured as a transformer neural network architecture. Specifically, the transformer model is coupled to receive sequential data tokenized into a sequence of input tokens and generates a sequence of output tokens depending on the task to be performed.

The model serving system 150 receives a request including input data (e.g., text data, audio data, image data, or video data) and encodes the input data into a set of input tokens. The model serving system 150 applies the machine-learned model to generate a set of output tokens. Each token in the set of input tokens or the set of output tokens may correspond to a text unit. For example, a token may correspond to a word, a punctuation symbol, a space, a phrase, a paragraph, and the like. For an example query processing task, the language model may receive a sequence of input tokens that represent a query and generate a sequence of output tokens that represent a response to the query. For a translation task, the transformer model may receive a sequence of input tokens that represent a paragraph in German and generate a sequence of output tokens that represents a translation of the paragraph or sentence in English. For a text generation task, the transformer model may receive a prompt and continue the conversation or expand on the given prompt in human-like text.

When the machine-learned model is a language model, the sequence of input tokens or output tokens are arranged as a tensor with one or more dimensions, for example, one dimension, two dimensions, or three dimensions. For example, one dimension of the tensor may represent the number of tokens (e.g., length of a sentence), one dimension of the tensor may represent a sample number in a batch of input data that is processed together, and one dimension of the tensor may represent a space in an embedding space. However, it is appreciated that in other embodiments, the input data or the output data may be configured as any number of appropriate dimensions depending on whether the data is in the form of image data, video data, audio data, and the like. For example, for three-dimensional image data, the input data may be a series of pixel values arranged along a first dimension and a second dimension, and further arranged along a third dimension corresponding to RGB channels of the pixels.

In one or more embodiments, the language models are large language models (LLMs) that are trained on a large corpus of training data to generate outputs for the NLP tasks. An LLM may be trained on massive amounts of text data, often involving billions of words or text units. The large amount of training data from various data sources allows the LLM to generate outputs for many tasks. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Since an LLM has significant parameter size and the amount of computational power for inference or training the LLM is high, the LLM may be deployed on an infrastructure configured with, for example, supercomputers that provide enhanced computing capability (e.g., graphic processor units) for training or deploying deep neural network models. In one instance, the LLM may be trained and deployed or hosted on a cloud infrastructure service. The LLM may be pre-trained by the online system 140 or one or more entities different from the online system 140. An LLM may be trained on a large amount of data from various data sources. For example, the data sources include websites, articles, posts on the web, and the like. From this massive amount of data coupled with the computing power of LLM's, the LLM is able to perform various tasks and synthesize and formulate output responses based on information extracted from the training data.

In one or more embodiments, when the machine-learned model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In another embodiment, the transformer architecture may have an encoder-decoder architecture and includes a set of encoders coupled to a set of decoders. An encoder or decoder may include one or more attention operations.

While a LLM with a transformer-based architecture is described as a primary embodiment, it is appreciated that in other embodiments, the language model can be configured as any other appropriate architecture including, but not limited to, long short-term memory (LSTM) networks, Markov networks, BART, generative-adversarial networks (GAN), diffusion models (e.g., Diffusion-LM), and the like.

In one or more embodiments, the online system 140 configures one or more system AI agents on behalf of the online system 140 and/or one or more user AI agents on behalf of the users of the online system 140 that can intelligently make decisions and perform tasks on behalf of the online system 140 and users of the online system 140. Specifically, an AI agent is a decision-making computer system powered by one or more large-scale language models (LLM's) that aid in the decision making. The AI agent is also coupled to an agent executor that is a computer process (e.g., Python process) responsible for triggering the AI agent and also executing actions that the AI agent would like to execute through its reasoning process.

In one or more embodiments, a user of the online system 140 accesses one or more applications of an online system 140 via a user AI agent to represent the user to perform various tasks in conjunction with the online system 140 (e.g., order items or browse and inspect recommendations on items and recipes). However, current online computing systems may lack systems that effectively engage with these agents and take advantage of the interactions and knowledge base.

Therefore, in some embodiments, the online system 140 deploys various mechanisms to interact with user AI agents. As an example, the online system 140 may detect the presence of a user AI agent instance associated with a particular user login by requesting to self-identify or asking whether the entity is an AI agent. Responsive to detecting the presence of a user AI agent, the online system 140 configures different types of responses to the user AI agent, such as providing fewer search results for browsing requests to reduce web scraping of data managed by the online system 140 and/or reducing interaction with human operators associated with the online system 140.

In one or more embodiments, the online system 140 configures one or more system AI agent instances that interact with user AI agents and performs one or more tasks on behalf of the online system 140. Thus, responsive to detecting the presence of a user AI agent representing a particular user, the online system 140 directs the session for the user to communicate and interact with a system AI agent. In one or more embodiments, the system AI agent and/or the user AI agent is responsible for performing a negotiating task, where the AI agents interact by suggesting offers, counter-offers, and the like to purchase items, provide discounts on items, promotion of certain items, and the like.

In this manner, the system AI agent can represent the online system 140 by interacting with a user AI agent, and also perform negotiations that may prevent the need to build complicated application programming interfaces (API's) or modules to interact with these AI agents. In addition, since an AI agent is a computer system coupled to an underlying model, tools, and computer processes for executing certain tools based on decision-making, the system AI agent can negotiate with a user AI agent without the need to worry about negative emotional human responses that may arise during prolonged negotiations. A more detailed description of the architecture of the AI agents and an example process is described with respect to FIGS. 2 through 6 below.

The interface system 160 is a framework for designing applications powered by underlying machine-learning models, such as large-language models (LLM's). The interface system 160 chains together components like prompt templates, memory, agent instances, and external data sources, and enables integration with tools like API's, databases, search engines, and the like. A tool may be a function that can be called to process an action. In one or more embodiments, the online system 140 described herein uses the interface system 160 to deploy AI agent instances (i.e., system AI agent and/or user AI agent), agent executor instances for executing various tools based on agent decision-making, and the like. A more detailed description of the architecture of the interface system 160 is described with respect to FIG. 3 below.

Figure 1B:
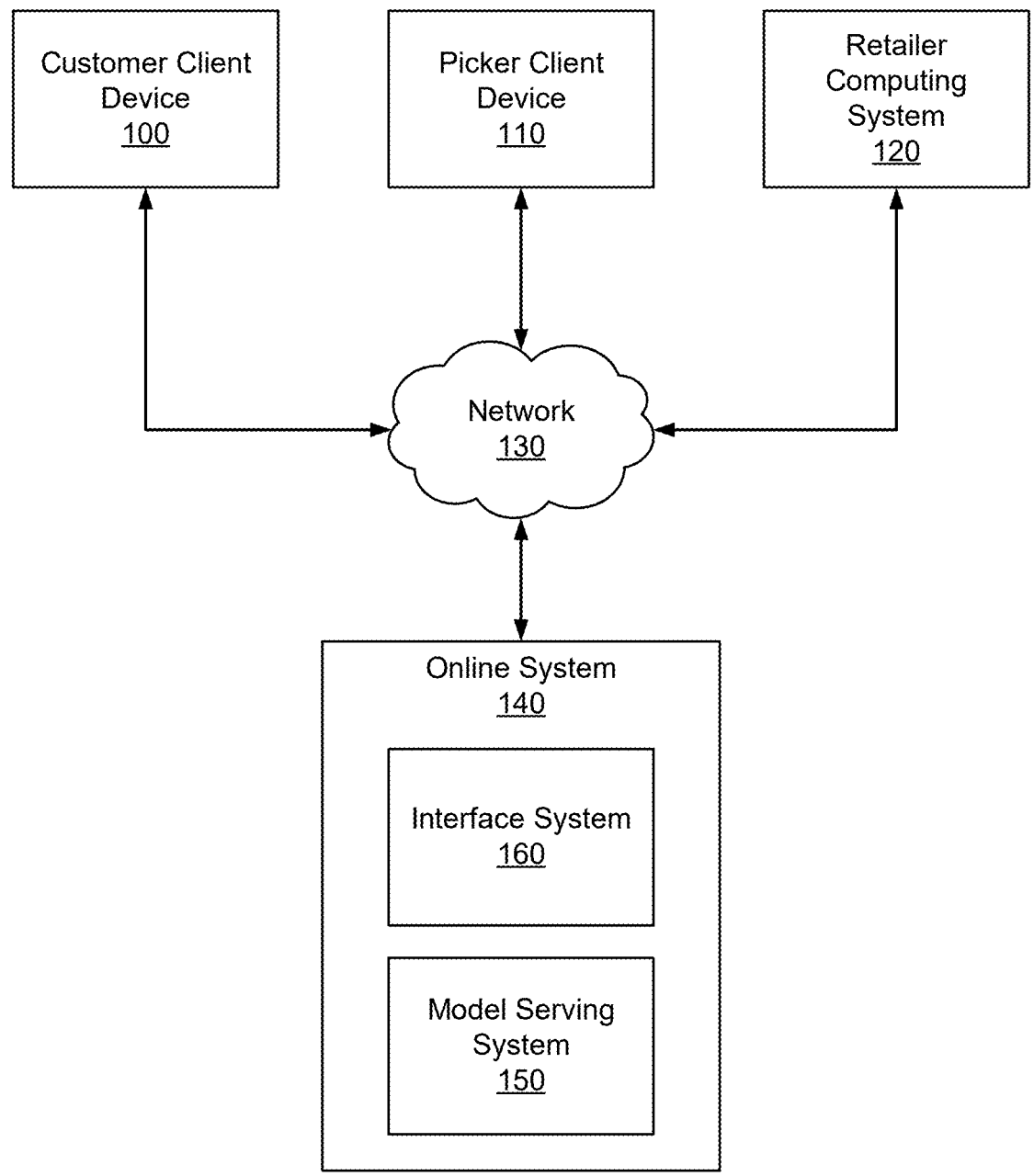
FIG. 1B illustrates an example system environment for an online system, in accordance with one or more embodiments.

FIG. 1B illustrates an example system environment for an online system 140, in accordance with one or more embodiments. The system environment illustrated in FIG. 1B includes a customer client device 100, a picker client device 110, a retailer computing system 120, a network 130, and an online system 140. Alternative embodiments may include more, fewer, or different components from those illustrated in FIG. 1B, and the functionality of each component may be divided between the components differently from the description below. Additionally, each component may perform their respective functionalities in response to a request from a human, or automatically without human intervention.

Figure 2:
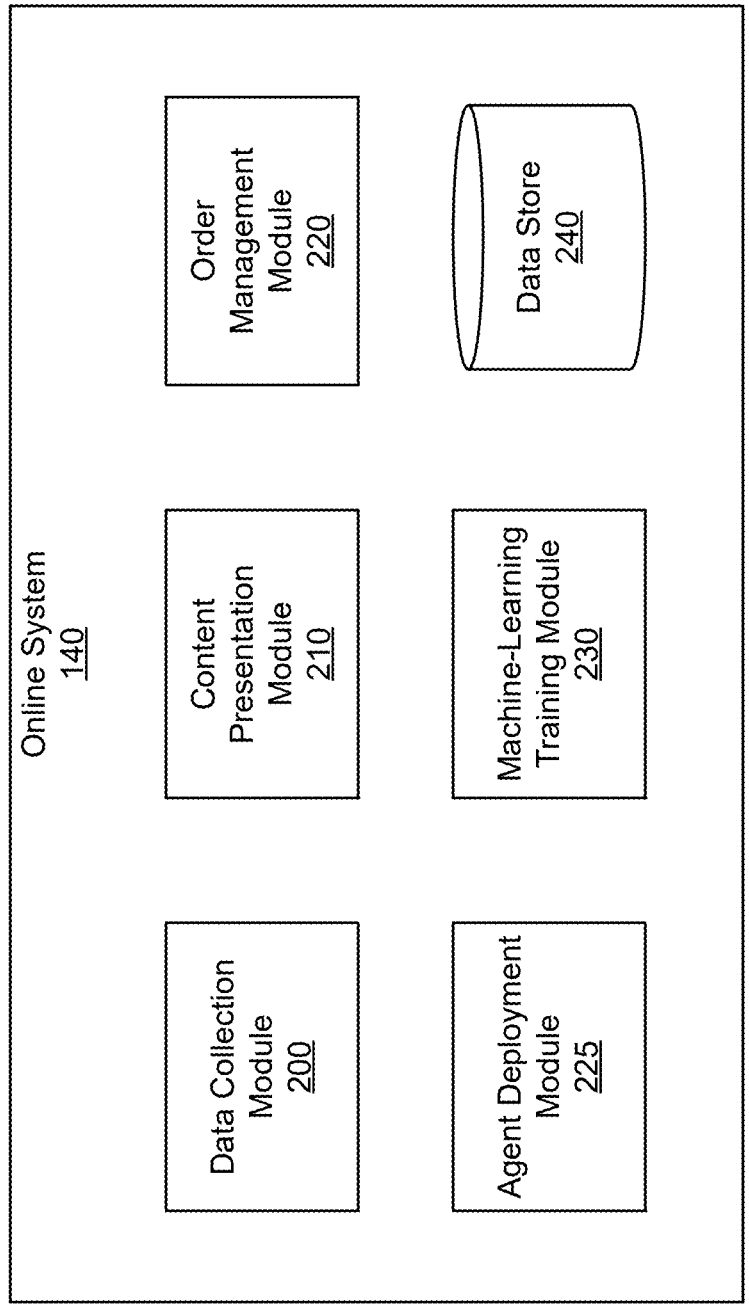
FIG. 2 illustrates an example system architecture for an online system, in accordance with one or more embodiments.

FIG. 2 illustrates an example system architecture for an online system 140, in accordance with one or more embodiments. The system architecture illustrated in FIG. 2 includes a data collection module 200, a content presentation module 210, an order management module 220, an order management module 220, an agent deployment module 225, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data describing characteristics of pickers. As an example, the picker data for a picker may include the picker's name, the picker's location, how often the picker services orders for the online system 140, a customer rating for the picker, which retailers the picker has collected items at, and/or the picker's previous shopping history. In addition, the picker data may include preferences expressed by the picker, such as preferred retailers to collect items at, how far they are willing to travel to deliver items to a customer, how many items they are willing to collect at a time, timeframes within which the picker is willing to service orders, and/or payment information by which the picker is to be paid for servicing orders (e.g., a bank account). The data collection module 200 collects picker data from sensors of the picker client device 110 and/or from the picker's interactions with the online system 140.

In addition, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. The order data may further include information describing how the order was serviced, such as which picker serviced the order, when the order was delivered, or a rating that the customer gave the delivery of the order. In one or more embodiments, the order data includes user data for users associated with the order, such as customer data for a customer who placed the order or picker data for a picker who serviced the order.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In one or more embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In one or more embodiments, the item selection model uses item embeddings describing items and customer embeddings describing customers to score items. These item embeddings and customer embeddings may be generated by separate machine learning models and may be stored in the data store 240.

In one or more embodiments, the content presentation module 210 scores items based on a search query received from the customer client device 100. A search query is free text for a word or set of words that indicate items of interest to the customer. The content presentation module 210 scores items based on a relatedness of the items to the search query. As an example, the content presentation module 210 may apply natural language processing (NLP) techniques to the text in the search query to generate a search query representation (e.g., an embedding) that represents characteristics of the search query. The content presentation module 210 uses the search query representation to score candidate items for presentation to a customer (e.g., by comparing a search query embedding to an item embedding).

In one or more embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weigh the score for an item based on the predicted availability of the item. Alternatively, the content presentation module 210 filters out items from presentation to a customer based on whether the predicted availability of the item exceeds a threshold.

The order management module 220 that manages orders for items from customers. The order management module 220 receives orders from a customer client device 100 and offers the orders to pickers for service based on picker data. For example, the order management module 220 offers an order to a picker based on the picker's location and the location of the retailer from which the ordered items are to be collected. The order management module 220 may also offer an order to a picker based on how many items are in the order, a vehicle operated by the picker, the delivery location, the picker's preferences on how far to travel to deliver an order, the picker's ratings by customers, or how often a picker agrees to service an order.

In one or more embodiments, the order management module 220 determines when to offer an order to a picker based on a delivery timeframe requested by the customer with the order. The order management module 220 computes an estimated amount of time that it would take for a picker to collect the items for an order and deliver the ordered item to the delivery location for the order. The order management module 220 offers the order to a picker user at a time such that, if the picker immediately services the order, the picker is likely to deliver the order at a time within the timeframe. Thus, when the order management module 220 receives an order, the order management module 220 may delay in offering the order to a picker if the timeframe is far enough in the future.

When the order management module 220 offers an order to a picker, the order management module 220 transmits the order to the picker client device 110 associated with the picker. The order management module 220 also transmits navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In one or more embodiments, the order management module 220 receives images of the items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In one or more embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and also updates the customer with the location of the picker so that the customer can track the progress of their order. In some embodiments, the order management module 220 computes an estimated time of arrival for the picker at the delivery location and provides the estimated time of arrival to the customer.

In one or more embodiments, the order management module 220 facilitates the communication between the customer client device 100 and the picker client device 110. As noted above, a customer user may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In one or more embodiments, the order management module 220 stores the payment information for use in subsequent orders by the customer. The order management module 220 computes a total cost for the order and charges the customer the cost. The order management module 220 may provide a portion of the total cost to the picker for servicing the order, and another portion of the total cost to the retailer.

The agent deployment module 225 generates and deploys one or more instances of AI agents, including system AI agents and/or user AI agents in conjunction with the interface system 160. In one or more embodiments, the agent deployment module 225 initiates an environment and installs any dependencies or libraries for installing the interface system 160. As described in further detail below, an AI agent instance is coupled to a LLM that powers the decision-making process. For each AI agent instance, the agent deployment module 225 selects an LLM that will be coupled to the AI agent. Moreover, the AI agent instance will have access to one or more tools. The agent deployment module 225 therefore is responsible for registering one or more tools with the interface system 160 or selecting tools that are already available on the interface system 160 for the AI agent to have access to.

As further described below in conjunction with the interface system 160, in one or more embodiments, the agent deployment module 225 obtains records of previous interactions between AI agents (e.g., between system AI agents and user AI agents). The agent deployment module 225 may annotate the records and also use these records to further improve the underlying models for the AI agents. For example, the agent deployment module 225 may be responsible for finetuning or improving the underlying models to incorporate positive instances of interactions and negotiations between AI agents.

Interface System for Deploying AI Agents

Figure 3:
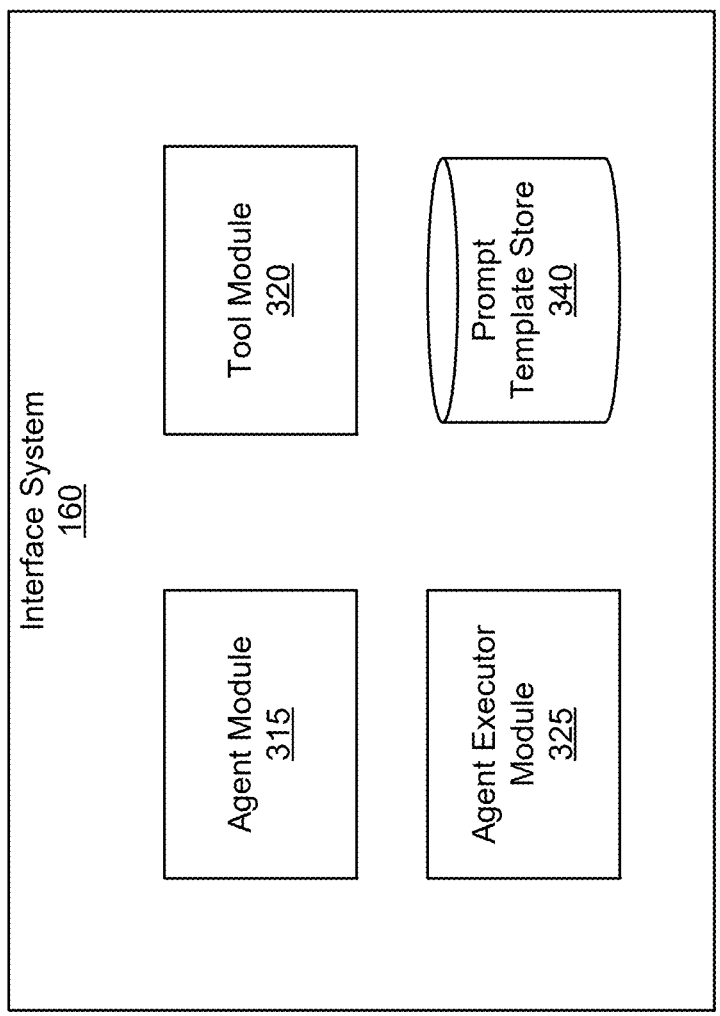
FIG. 3 illustrates an example system architecture for an interface system, in accordance with one or more embodiments.

FIG. 3 illustrates an example system architecture for an interface system 160, in accordance with one or more embodiments. The system architecture illustrated in FIG. 3 includes an agent module 315, a tool module 320, an agent executor module 325, and a prompt template store 340. Alternative embodiments may include more, fewer, or different components from those illustrated in FIG. 3, and the functionality of each component may be divided between the components differently from the description below. Additionally, each component may perform their respective functionalities in response to a request from a human, or automatically without human intervention.

The agent module 315 creates AI agent instances, including system AI agent instances and user AI agent instances. Specifically, the agent module 315 may manage and deploy one or more machine-learning models (e.g., LLM's) that power the decision-making of AI agent instances. The agent module 315 may coordinate the training processes of the underlying models for AI agents, such that the parameters of the models are effective in addressing tasks that the AI agent is responsible for.

Figure 4:
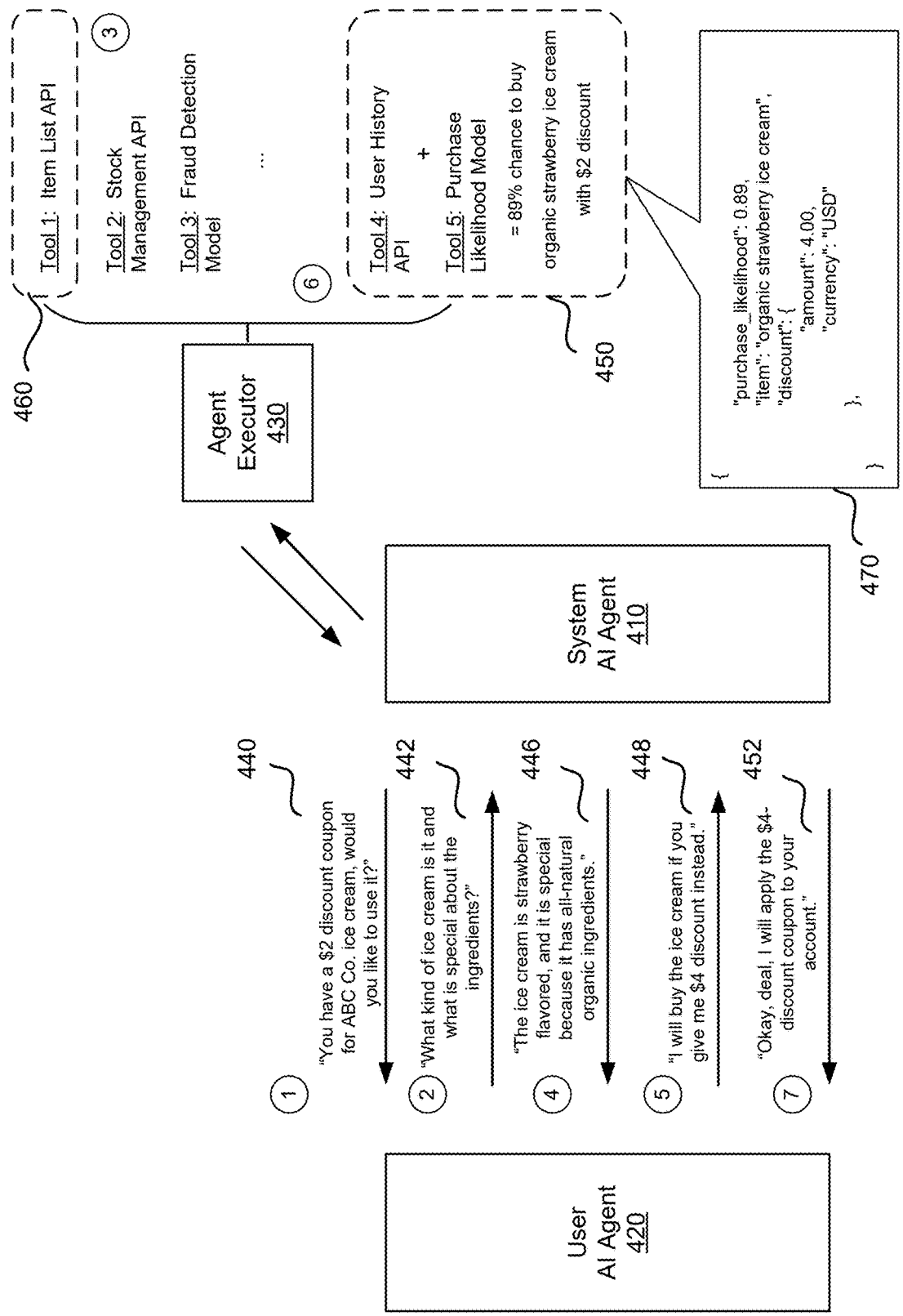
FIG. 4 illustrates a process diagram for a system AI agent instance interacting with a user AI agent, in accordance with one or more embodiments.

FIG. 4 illustrates an example computer environment in which a system AI agent instance interacts with a user AI agent, in accordance with one or more embodiments. In one or more embodiments, the agent module 315 creates one or more system AI agent instances and/or one or more user AI agent instances. As shown in FIG. 4, the agent module 315 creates an instance of a system AI agent 410. The environment also includes a user AI agent instance 420. In one or more embodiments, the user AI agent 420 may be created by the agent module 315 of the online system 140, but in other embodiments, the user AI agent 420 may be a third-party agent deployed by a third-party entity that the user is affiliated with.

In one or more embodiments, the agent deployment module 225 trains a system agent model. The system agent model is a machine-learning model deployed on the model serving system 150 that powers the decision-making capabilities of the system AI agent instance. In one or more embodiments, the system AI agent is programmed to handle requests received from the user AI agent. The system AI agent has access to information about the online system 140, including the inventory of items, pricing details, promotional offers, and delivery options. The system AI agent may also have access to previously revealed user data like a user's shopping history, preferences, information about the user, budget constraints, and the like. In one or more embodiments, the system agent model may be configured as transformer architectures and/or recurrent neural networks (RNN's). However, it is appreciated that any appropriate model can be used to power the underlying system agent model.

In one or more embodiments, the input features to the system agent model may include one or a combination of current stock levels in inventory, historical sales data, customer demand forecasts, pricing details across product ranges, availability and details of promotional offers, delivery slots, customer feedback, and history of interactions with user AI agent instances. It can also include elements of conversational data, such as the languages and phrases used by user AI agents and their requests in their messages.

The outputs of the system agent model may include one or a combination appropriate responses to requests from user AI agents, own proposals during price or delivery negotiations, and decision-making data such as when to offer promotional deals or alternative products.

In some embodiments, the agent module 315 trains or finetunes a pretrained system agent model based on one or more types of training data. In one or more embodiments, the training data includes one or a combination of historical data including transaction logs, inventory records, customer interaction data, response data from customer service interactions, and other relevant data collected from the operation of the online system 140. In one or more embodiments, as the agent module 315 obtains conversations between different system AI agent and user AI agent sessions, the system agent model may be regularly updated or retrained with recent data. The agent module 315 performs a retraining process similar to the training process but with more recent data and conversations.

In one or more embodiments, the agent deployment module 225 trains a user agent model. The user agent model is a machine-learning model deployed on the model serving system 150 or other third-party serving system that powers the decision-making capabilities of the user AI agent instance. In one or more embodiments, the user AI agent is programmed to handle requests received from the system AI agent. The user AI agent has access to information about the user, including user preferences, shopping history, and budget constraints. In one or more embodiments, the system agent model may be configured as transformer architectures and/or recurrent neural networks (RNN's). However, it is appreciated that any appropriate model can be used to power the underlying user agent model.

In one or more embodiments, the input features to the user agent model may include one or a combination of user preferences, shopping history, budget details, past negotiation results, products of interest, frequency of purchases, and other metadata related to the user's shopping decisions. It can also include the responses or proposals received from the system AI agents of the online system 140 during the interactions.

The outputs of the user agent model may include one or a combination of best actions or decisions at any given step of the shopping process for the user. This can include determining which online systems to interact with, which items to consider or ignore, what initial proposals to make in a negotiation, how to react to counter-proposals, and which final decisions to make for transactions.

In some embodiments, the agent deployment module 225 trains or finetunes a pretrained user agent model based on the one or more types of training data. In one or more embodiments, the training data includes one or a combination of historical data featuring the user's online shopping behaviors, including data on item searches, viewed items, added-to-cart and purchased items, proactive interaction with online systems, abandoned carts, delivery selections, and the like. The agent module 315 performs a retraining process similar to the training process but with more recent data and conversations.

The tool module 320 receives one or more tools for registration that may be used by different AI agent instances for reasoning and decision-making. A tool is a function that performs a particular action, such as search, API's, machine-learning models, and the like. In one or more embodiments, the tools may include built-in tools implemented by other entities, such as search tools for executing real-time web search, math tools for performing arithmetic via LLM reasoning, Python REPL tools for executing custom Python code in a sandboxed environment, file tools for reading files of particular formats such as PDF's, DOCX, CSV's, and terminal tools for running shell commands.

In one or more embodiments, the tool module 320 also allows an entity such as the online system 140 to configure custom tools that are developed by the online system 140. Responsive to receiving details of the custom tool (e.g., code for API or machine-learning model), the tool module 320 wraps the function or API in a tool object so that an AI agent instance can use them during reasoning. As shown in FIG. 4, the system AI agent 410 is coupled to access a set of tools. The set of tools include an item list API that retrieves a list of items in a catalogue store of the online system 140, a stock management API that retrieves inventory information for items, a fraud detection model that is coupled to receive messages and determine a likelihood there is a fraudulent application, and/or a purchase likelihood model that is coupled to receive data of a user or offer from a user and determine a likelihood that a user will purchase a particular item given some parameters (e.g., level of discount) for the item. Other than the tools illustrated in FIG. 4, the set of tools may also include a delivery status API for accessing the delivery status information for an order, or an order status API for accessing the status of a submitted order.

The agent executor module 325 is a runtime engine that iteratively executes the AI agent, executes the actions it chooses via the tools selected by the AI agent, passes the action outputs back to the AI agent, and repeats until a final answer is output from the AI agent. In one or more embodiments, an instance of an agent executor iteratively executes the AI agent to obtain a series of "thought-actions" to resolve and generate a response to a request specified in the prompt for that iteration. As an example, responsive to receiving a message from the user AI agent for that iteration, the request to the system AI agent may be to formulate a response to the message during an agent-to-agent negotiation.

For each iteration, the agent executor module 325 provides a prompt to the underlying model for the AI agent that includes one or a combination of (1) a request (e.g., formulate a response to message from user AI agent), (2) additional contextual information about the request (e.g., content of the message from the user AI agent or user information), (3) a set of tools available for use by the AI agent, descriptions for each tool, and input types to the tools, (4) an ask to provide a "thought" or reasoning for the request and an action to take based on the reasoning and action inputs for that action. The model serving system 150 executes the prompt using the underlying LLM and returns a response. The instance of the agent executor executes a tool corresponding to the selected action based on the action inputs. This may generate an observation (i.e., results of executing the tool), which is provided to the LLM for the next iteration. The process is repeated until a final answer is obtained.

Example functionalities of the components of the AI agent (e.g., system AI agent instance) are described in further detail below in connection with FIG. 4. The agent deployment module 225 may detect the presence of an instance of a user AI agent representing a user of the online system 140. For one or more iterations, the agent executor module 325 receives a message from the user AI agent. The agent executor module 325 provides one or more prompts for input to the underlying LLM (e.g., system agent model) to request actions to execute for a current iteration based on the received message from the user AI agent. The agent executor module 325 parses responses from the underlying LLM to extract a set of selected actions and action inputs for the set of selected actions. The agent executor module 325 sequentially triggers execution of a set of respective tools corresponding to the selected actions with the action inputs. The agent executor module 325 obtains a message for the user AI agent for the current iteration based at least on results of executing the set of respective tools, and provides the generated message for the current iteration to the user AI agent. This process is repeated until the conversation between the agents is completed. For example, the conversation is complete if there is a proposed agreement for one or more tasks to perform for the user.

In one or more embodiments, the agent deployment module 225 extracts a proposed agreement between the interaction of the messages between the system AI agent and the user AI agent. The agent deployment module 225 identifies one or more tasks for executing the proposed agreement.

In the example environment shown in FIG. 4, the system AI agent instance 410 has access to available discount pools for an ice cream item from company ABC Co. from a database of the online system 140. For example, the system AI agent 410 may determine that there is a total discount pool of $200 for this particular ice cream product to distribute to users over a span of one week. The agent executor instance 430 provides one or more prompts to the system agent model (e.g., LLM) to request formulation of an initial offer to promote the discount for the item. The response from the model may be a message 440 for the user AI agent 420 "[y]ou have a $2-discount coupon for ABC Co. ice cream, would you like to use it?"

The system AI agent 410 receives a reply message 442 from the user AI agent 420 "[w]hat kind of ice cream is it and what is special about the ingredients?" For a next iteration, the agent executor 430 prompts the LLM with the message 442 and a request to output one or more actions to take. From the response, the agent executor instance 430 identifies that the selected action to take is prompting the item list API tool with input parameters designating a name of the item. The agent executor 430 invokes the API and obtains a response describing various properties of the ice cream item. Based on this observation, the agent executor 430 prompts the LLM for the system AI agent 410 and obtains a message 446 for the user AI agent 420 "[t]he ice cream is strawberry flavored, and it is special because it has all-natural organic ingredients."

The system AI agent 410 receives a reply message 448 from the user AI agent 420 "I will buy the ice cream if you give me $4 discount instead." For a next iteration, the agent executor 430 prompts the LLM with the message 448 and a request to output one or more actions to take. From the response, the agent executor instance 430 identifies that one selected action to take is invoking the user history API tool with input parameters designating an identifier for the user that the user AI agent 420 is representing. The agent executor 430 invokes the API and obtains a response describing historical interactions with the user or user AI agents associated with the user, user purchase history, user preferences, and the like. Based on this observation, the agent executor 430 prompts the LLM for the system AI agent 410 and determines that based on the user's previous interactions with the online system 140, the counter-offer for a $4-discount coupon is a credible counter-offer and the user is likely to purchase the ice cream item if given the discount coupon.

Moreover, the agent executor instance 430 also identifies that another selected action to take is execution of a purchase likelihood machine-learning model that is coupled to receive information on the user and potential discounts for an item, and generate a likelihood that the user will purchase the item given the discount. The agent executor 430 invokes the model, and obtains an API response 470 describing that the purchase likelihood is 0.89 for the item, which is relatively high. Based on these observations, the agent executor 430 prompts the LLM for the system AI agent 410 and determines that there is a high likelihood the user will purchase the ice cream item if given a $4-discount coupon, and the total long-term profit value for the user is above a threshold and decides to give the user the coupon. Therefore, the agent executor 430 prompts the LLM and obtains a message 452 for the user AI agent 420 "[o]kay, deal, I will apply the $4-discount coupon to your account."

The agent deployment module 225 continuously monitors the conversation between the agents 410 and 420, and extracts a completed agreement from the interaction. In the example shown in FIG. 4, the agreement is to provide the $4-discount coupon to the user's account if the user decides to purchase the ice cream item. The agent deployment module 225 invokes one or more modules or APIs for completing this task in the online system 140.

Improving Interaction Models for AI Agents

In one or more embodiments, the agent deployment module 225 continuously improves the underlying models of the AI agents by further improving the models or implementing additional or alternative machine-learning models. In one or more embodiments, the improvements involve training and retraining of the models based on actual usage data, labeled data, customer feedback, human-annotated data, customer review and other relevant, acquired information. This allows the models to continuously adapt and improve, becoming more aligned with user expectations and needs over time.

Therefore, in one or more embodiments, the agent module 315 obtains one or more records of previous or simulated interactions. A record may include messages exchanged for a respective interaction between the system AI agent and another instance of a user AI agent as well as tools executed for the interaction. In one or more embodiments, the agent module 315 assigns a performance evaluation to each record, where the performance evaluation for each record indicates a degree of performance obtained by the system AI agent with respect to one or more criteria. For example, the performance evaluation may indicate that after a certain interaction (e.g., completed negotiation), the user returned very positive feedback or long-term profits for the particular user improved by 80%.

In some embodiments, the agent module 315 incorporates these records with known performance feedback via one or more methods. In one instance, the agent module 315 provides the one or more records and performance evaluations for the one or more records in the prompts to the LLM, such that the LLM is able to incorporate this example when generating responses for other interactions. In other embodiments, the agent deployment module 225 may use these records to finetune the parameters of the underlying model for AI agents, such that the knowledge from these records are incorporated into the parameter values of the model.

In one or more embodiments, the agent deployment module 225 improves the underlying model for an AI agent that generates interactions facing a user AI agent. The improved model is coupled to receive input features such as interaction history, negotiation history, customer behavior data, and customer's explicit and inferred preferences. Other factors like order history, customer ratings, time stamps, and frequency of interactions could also be included. When dealing with the negotiation dynamics, inputs like initial proposal, counter-offers, final agreed terms, and latency in response can also be included, as described in conjunction with FIG. 4 (e.g., prompts to the LLM).

The improved model is configured to generate outputs such as the optimized negotiation strategy for the system AI agent. This could include recommended actions or responses for the agent like pricing proposals, delivery options, or promotional offers aimed to improve the chances of transaction finalization and user satisfaction.

In one or more embodiments, the model can be trained on a dataset that includes historical customer interaction data, negotiation data, and transactional data. The process would involve using a machine-learning process such as reinforcement learning, where the model learns to take actions by increasing cumulative rewards. The rewards can be defined as successfully closed transactions, improved user satisfaction, or increased or maximized profits.

The model can also be periodically retrained to stay current with user preferences and trends. Retraining can be performed using more recent data, following the same training process as above. Online learning strategies could be a practical choice for retraining, where the model is continuously updated with the latest interactions and negotiation outcomes. Feedback from both successful and unsuccessful interactions can be used to adjust parameters, enabling the AI agent to learn over time and improve the negotiation strategy.

In one or more embodiments, the agent deployment module 225 trains one or more preference models that maps user behavior across multiple visits, amalgamating explicit and inferred preferences for users. The outputs of the preference model may be used in executing negotiating tactics and other shopping actions for users. In one or more embodiments, the preference model is integrated into the underlying model of an AI agent. In one or more embodiments, the input features to the preference model includes one or a combination of user search queries, frequency and timing of orders, time spent browsing certain products or categories, past purchase history, user ratings and comments, as well as engagement and/or promotional offers. Additionally, behavioral data, such as frequency of returning products, choosing specific delivery times, or consistency in brand choice can be incorporated as inputs.

The outputs of the preference model may include a profile representing the user's explicit and inferred preferences. The profile could indicate user affinity towards certain items, brands, price ranges, delivery options, and shopping times, among others. The preference model could also predict a user's potential interest in other similar items based on these preferences.

In one or more embodiments, the preference model can be trained using historical user data on the online system 140, including search history, purchase history, feedback history, and browsing behavior. Machine-learning techniques such as decision trees, random forests, or gradient boosting, could be used for learning explicit preferences. In contrast, techniques like collaborative filtering or latent factor models could be used for inferring implicit preferences from the data. Regularization parameters can also be added to avoid overfitting and improve model generalization.

The preference model may also be retrained as user behavior and preferences change over time. The retraining process may involve the use of recent user data, maintaining the same features as earlier, but integrating more recent user interactions and transactions.

Deploying AI Agents for Sequence of Phases

Figure 5:
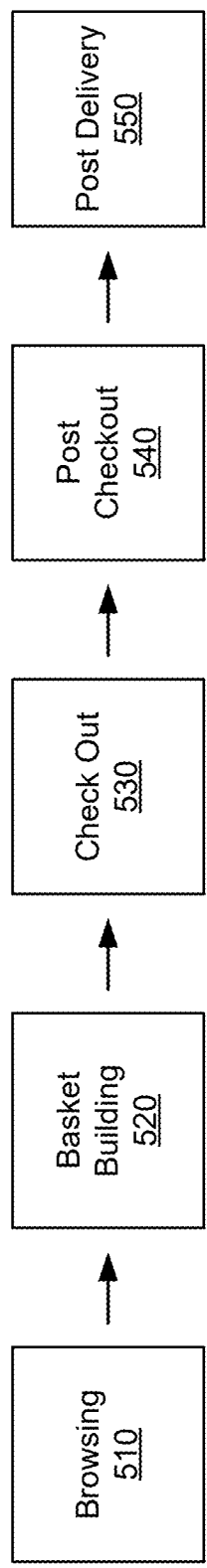
FIG. 5 illustrates a set of phases for deploying a system AI agent instance for an online system, in accordance with one or more embodiments.

FIG. 5 illustrates a sequence of phases for deploying one or more AI agents for an online system 140, in accordance with one or more embodiments. In one or more embodiments, the agent deployment module 225 configures and deploys AI agents (e.g., system AI agents or user AI agents) across one or more phases of order fulfillment. In one or more embodiments, as shown in FIG. 5, the sequence of phases include a browsing phase 510 where a user or user AI agent browses items using an application of the online system 140. The next phase includes a basket building phase 520 where a user or user AI agent adds items to a user's basket or order and the online system 140 may also provide one or more additional recommendations or content items to the user. The next phase includes a check out phase 530 where a user or user AI agent pays the order. The next phase includes a post checkout phase 540 where the online system 140 coordinates a picker user to fulfill the user's order and tracks the delivery status of the order to the user's residence. The next phase is a post delivery phase 550 where the online system 140 may receive feedback from the user and incorporate that feedback into subsequent orders in the future.

The machine learning training module 230 trains machine learning models used by the online system 140. For example, the machine learning module 230 may train any of the machine-learned models deployed by the model serving system 150. The online system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross entropy loss function. The machine learning training module 230 updates the set of parameters for the machine learning model based on the score generated by the loss function. For example, the machine learning training module 230 may apply gradient descent to update the set of parameters.

The data store 240 stores data used by the online concierge system 140. For example, the data store 240 stores customer data, item data, order data, and picker data for use by the online concierge system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

With respect to the machine-learned models hosted by the model serving system 150, the machine-learned models may already be trained by a separate entity from the entity responsible for the online concierge system 140. In another embodiment, when the model serving system 150 is included in the online concierge system 140, the machine-learning training module 230 may further train parameters of the machine-learned model based on data specific to the online concierge system 140 stored in the data store 240. As an example, the machine-learning training module 230 may obtain a pre-trained transformer language model and further fine tune the parameters of the transformer model using training data stored in the data store 240. The machine-learning training module 230 may provide the model to the model serving system 150 for deployment.

Figure 6A:
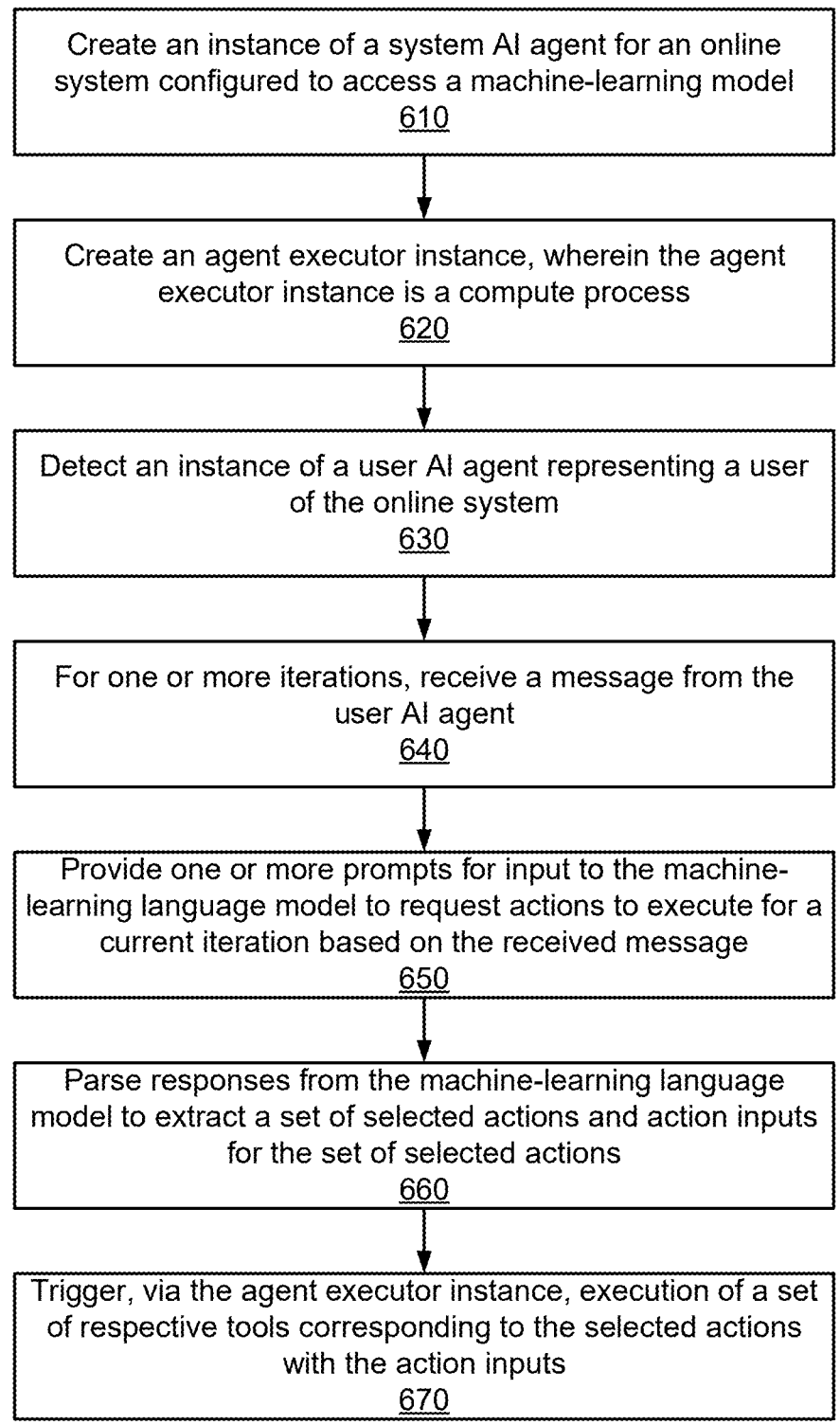
FIGS. 6A-6B is a flowchart for creating a system AI agent instance and generating interactions with a user AI agent instance, in accordance with one or more embodiments.
Figure 6B:
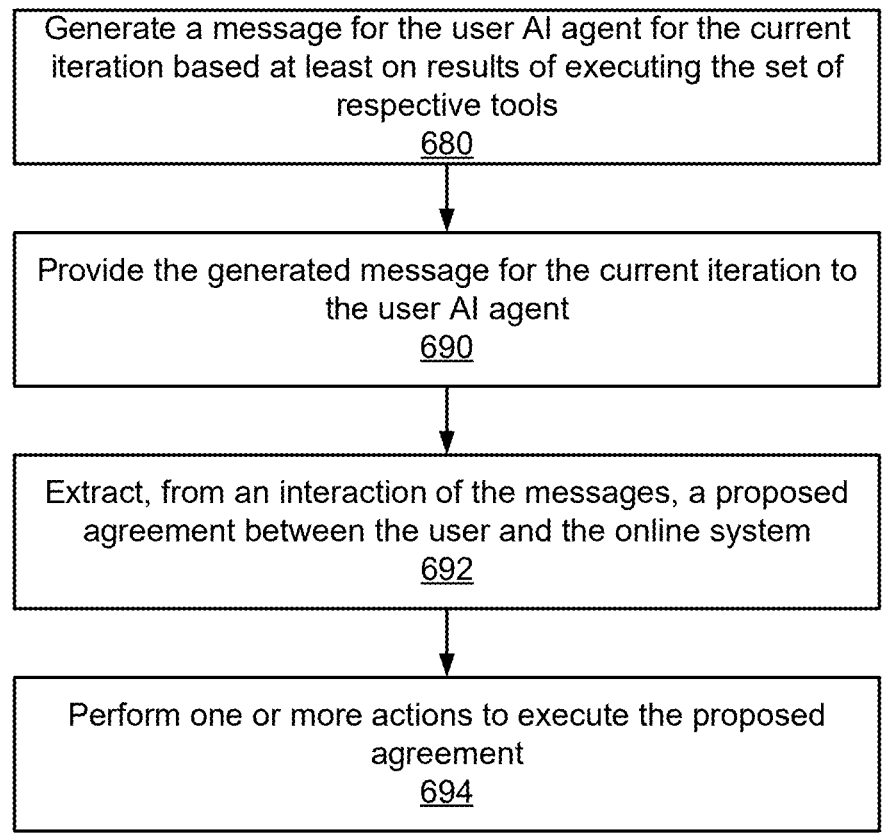

FIGS. 6A-6B is a flowchart for creating a system AI agent instance and generating interactions with a user AI agent instance, in accordance with one or more embodiments.

Alternative embodiments may include more, fewer, or different steps from those illustrated in FIGS. 6A-6B, and the steps may be performed in a different order from that illustrated in FIGS. 6A-6B. These steps may be performed by an online system (e.g., online system 140) or an interface system 160 configured by the online system 140. Additionally, each of these steps may be performed automatically by the online concierge system without human intervention.

The online system 140 creates 610 an instance of a system artificial intelligence (AI) agent for an online system. In some embodiments, the system AI agent is configured to access a machine-learning language model (e.g., LLM). The online system 140 creates 620 an agent executor instance. In some embodiments, the agent executor instance is a compute process. The online system 140 detects 630 an instance of a user AI agent representing a user of the online system 140.

For one or more iterations, the system AI agent receives 640 a message from the user AI agent. The online system 140 provides 650 one or more prompts for input to the machine-learning language model to request actions to execute for a current iteration based on the received message from the user AI agent. The online system 140 parses 660 responses from the machine-learning language model to extract a set of selected actions and action inputs for the set of selected actions. The online system 140 triggers 670, via the agent executor instance, execution of a set of respective tools corresponding to the selected actions with the action inputs. The system AI agent generates 680 a message for the user AI agent for the current iteration based at least on results of executing the set of respective tools. The system AI agent provides 690 the generated message for the current iteration to the user AI agent.

The online system 140 extracts 692, from the interaction of the messages between the system AI agent and the user AI agent, a proposed agreement between the user and the online system. The online system 140 performs 694 one or more actions to execute the proposed agreement.

ADDITIONAL CONSIDERATIONS

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In one or more embodiments, a software module is implemented with a computer program product comprising one or more computer-readable media storing computer program code or instructions, which can be executed by a computer processor for performing any or all of the steps, operations, or processes described. In one or more embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A computer-implemented method, comprising:
creating an instance of a system artificial intelligence (AI) agent for an online system, wherein the system AI agent is configured to access a machine-learning language model;
detecting an instance of a user AI agent representing a user of the online system;
for one or more iterations:
receiving a message from the user AI agent,
providing one or more prompts for input to the machine-learning language model to request actions to execute for a current iteration based on the received message from the user AI agent,
parsing responses from the machine-learning language model to extract a set of selected actions and action inputs for the set of selected actions, triggering, via an agent executor instance that is a compute process, execution of a set of respective tools corresponding to the selected actions with the action inputs, generating a message for the user AI agent for the current iteration based at least on results of executing the set of respective tools, and providing the generated message for the current iteration to the user AI agent;

extracting, from an interaction of the messages between the system AI agent and the user AI agent, a proposed agreement between the user and the online system;

performing one or more actions to execute the proposed agreement;

obtaining one or more records of previous or simulated interactions, wherein a record includes messages exchanged for a respective interaction between the system AI agent and another instance of a user AI agent, and tools executed for the interaction; and training parameters of the machine-learning language model based on the one or more records of the previous or simulated interactions.

2. The computer-implemented method of claim 1, further comprising:

configuring one or more tools on an interface system, wherein the one or more tools include one or a combination of:

a first tool configured to access resources via an application programming interface (API), and a second tool exposing functionalities of one or more task-based machine-learning models.

3. The computer-implemented method of claim 1, wherein training the parameters of the machine-learning language model further comprises:

computing a loss function including one or a combination of a first loss depending on a quality of user experience or a second loss depending on expected profits; and backpropagating terms obtained from the loss function to update the parameters of the machine-learning language model.

4. The computer-implemented method of claim 1, further comprising:

providing an offer to purchase or one or more items through the online system to the user AI agent, wherein the message from the user AI agent for at least one iteration in the one or more iterations is a counter-offer to an offer message, and wherein the message generated for the user AI agent indicates a decision whether to accept the counter-offer or reject the counter-offer.

5. The computer-implemented method of claim 1, further comprising:

assigning a performance evaluation to each record, wherein the performance evaluation for each record indicates a degree of performance obtained by the system AI agent with respect to one or more criteria.

6. The computer-implemented method of claim 5, further comprising: providing the one or more records and performance evaluations for the one or more records in the prompts to the machine-learning language model for at least one iteration in the one or more iterations.

7. The computer-implemented method of claim 1, wherein the set of respective tools includes at least one of: an item description application programming interface (API) for retrieving details of an item, a delivery status API for retrieving details of a delivery status of an order, a machine-learning model for detecting fraud, or a machine-learning model for computing a likelihood a respective user will purchase an item.

8. The computer-implemented method of claim 1, wherein the one or more actions is one or a combination of invoking an application programming interface (API) to retrieve or change a compute resource, triggering a search query, or executing one or more machine-learning models.

9. A non-transitory computer readable storage medium storing instructions that when executed by one or more computer processors cause the one or more computer processors to perform steps comprising:

creating an instance of a system artificial intelligence (AI) agent for an online system, wherein the system AI agent is configured to access a machine-learning language model;

detecting an instance of a user AI agent representing a user of the online system; for one or more iterations:

receiving a message from the user AI agent, providing one or more prompts for input to the machine-learning language model to request actions to execute for a current iteration based on the received message from the user AI agent, parsing responses from the machine-learning language model to extract a set of selected actions and action inputs for the set of selected actions, triggering, via an agent executor instance that is a compute process, execution of a set of respective tools corresponding to the selected actions with the action inputs, generating a message for the user AI agent for the current iteration based at least on results of executing the set of respective tools, and providing the generated message for the current iteration to the user AI agent;

extracting, from an interaction of the messages between the system AI agent and the user AI agent, a proposed agreement between the user and the online system;

performing one or more actions to execute the proposed agreement; and obtaining one or more records of previous or simulated interactions, wherein a record includes messages exchanged for a respective interaction between the system AI agent and another instance of a user AI agent and tools executed for the interaction; and training parameters of the machine-learning language model based on the one or more records of the previous or simulated interactions.

10. The non-transitory computer readable storage medium of claim 9, the instructions further causing the one or more computer processors to perform steps comprising: configuring one or more tools on an interface system, wherein the one or more tools include one or a combination of: a first tool configured to access resources via an application programming interface (API), and a second tool exposing functionalities of one or more task-based machine-learning models.

11. The non-transitory computer readable storage medium of claim 9, wherein training the parameters of the machine-learning language model further comprises:

computing a loss function including one or a combination of a first loss depending on a quality of user experience or a second loss depending on expected profits; and backpropagating terms obtained from the loss function to update the parameters of the machine-learning language model.

12. The non-transitory computer readable storage medium of claim 9, the instructions further causing the one or more computer processors to perform steps comprising:
providing an offer to purchase or one or more items through the online system to the user AI agent,
wherein the message from the user AI agent for at least one iteration in the one or more iterations is a counter-offer to an offer message, and wherein the message generated for the user AI agent indicates a decision whether to accept the counter-offer or reject the counter-offer.

13. The non-transitory computer readable storage medium of claim 9, the instructions further causing the one or more computer processors to perform steps comprising:
assigning a performance evaluation to each record, wherein the performance evaluation for each record indicates a degree of performance obtained by the system AI agent with respect to one or more criteria.

14. The non-transitory computer readable storage medium of claim 13, the instructions further causing the one or more computer processors to perform steps comprising: providing the one or more records and performance evaluations for the one or more records in the prompts to the machine-learning language model for at least one iteration in the one or more iterations.

15. The non-transitory computer readable storage medium of claim 9, wherein the set of respective tools includes at least one of an item description application programming interface (API) for retrieving details of an item, a delivery status API for retrieving details of a delivery status of an order, a machine-learning model for detecting fraud, or a machine-learning model for computing a likelihood a respective user will purchase an item.

16. The non-transitory computer readable storage medium of claim 9, wherein the one or more actions is one or a combination of invoking an application programming interface (API) to retrieve or change a compute resource, triggering a search query, or executing one or more machine-learning models.

17. A computer system, comprising:
one or more computer processors; and
a non-transitory computer readable storage medium storing instructions that when executed by the one or more computer processors cause the one or more computer processors to perform steps comprising:
creating an instance of a system artificial intelligence (AI) agent for an online system, wherein the system AI agent is configured to access a machine-learning language model;
detecting an instance of a user AI agent representing a user of the online system;
for one or more iterations:
receiving a message from the user AI agent,
providing one or more prompts for input to the machine-learning language model to request actions to execute for a current iteration based on the received message from the user AI agent,
parsing responses from the machine-learning language model to extract a set of selected actions and action inputs for the set of selected actions,
triggering, via an agent executor instance that is a compute process,
execution of a set of respective tools corresponding to the selected actions with the action inputs,
generating a message for the user AI agent for the current iteration based at least on results of executing the set of respective tools, and
providing the generated message for the current iteration to the user AI agent;
extracting, from an interaction of the messages between the system AI agent and the user AI agent, a proposed agreement between the user and the online system;
performing one or more actions to execute the proposed agreement;
obtaining one or more records of previous or simulated interactions, wherein a record includes messages exchanged for a respective interaction between the system AI agent and another instance of a user AI agent and tools executed for the interaction; and
training parameters of the machine-learning language model based on the one or more records of the previous or simulated interactions.

18. The computer system of claim 17, the instructions further causing the one or more computer processors to perform steps comprising: configuring one or more tools and on an interface system, wherein the one or more tools include one or a combination of: a first tool configured to access resources via an application programming interface (API), and a second tool exposing functionalities of one or more task-based machine-learning models.

* * * * *